April 12, 1932.     C. A. STEVENS     1,853,784
THRESHING CYLINDER
Filed Jan. 27, 1930
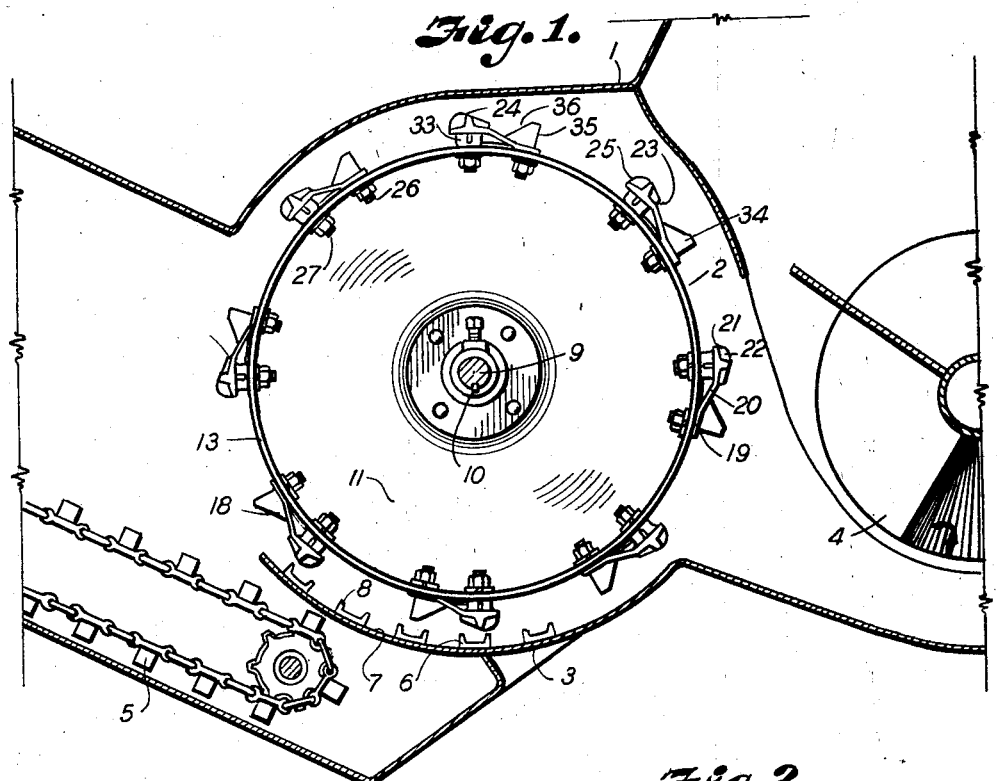
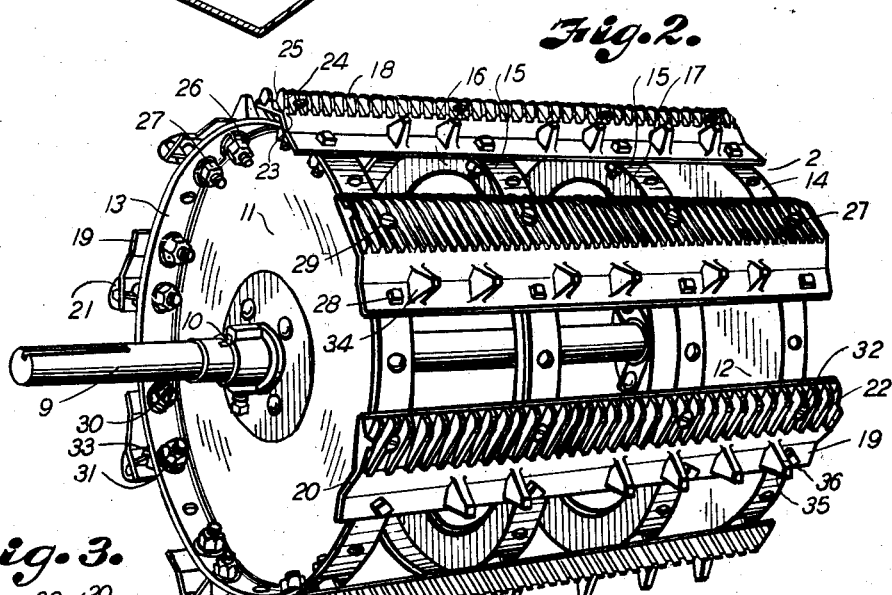
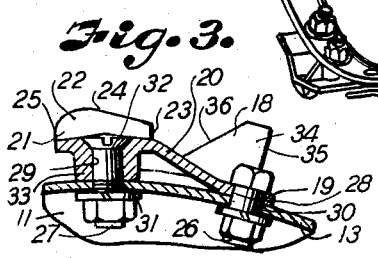
INVENTOR
Clarence A. Stevens
BY Arthur C. Brown
ATTORNEY Patented Apr. 12, 1932

1,853,784

UNITED STATES PATENT OFFICE

CLARENCE A. STEVENS, OF WICHITA, KANSAS, ASSIGNOR TO THE GLEANER COMBINE HARVESTER CORPORATION, OF INDEPENDENCE, MISSOURI, A CORPORATION OF DELAWARE

THRESHING CYLINDER

Application filed January 27, 1930. Serial No. 423,718.

My invention relates to threshing cylinders, and more particularly to threshing cylinders of the rasp type, the principal object of the invention being to improve the efficiency of cylinders of this type by effecting substantially positive feed of grain to and through the cylinder without chopping the grain or other stalks during the threshing operation.

In threshing cylinders of the ordinary tooth type the teeth or lugs on the cylinder and concaves provide a positive feed of grain to and through the cylinder but tend to chop the stalks so that proper separation of the grain is affected and quality of the grain lowered by presence of juices of weeds accompanying the grain. While cylinders of the rasp type will thresh effectively without the objectionable chopping, they do not draw the grain into the cylinder or feed it therethrough as effectively and there is a tendency of the stalks to bunch in the cylinder.

In accomplishing the object of my invention, I have devised a threshing cylinder combining the desirable qualities of the two types heretofore employed, the preferred form of which is illustrated in the accompanying drawings, wherein:—

Fig. 1 is a vertical, sectional view through the cylinder housing of a separator illustrating a threshing cylinder embodying my invention.

Fig. 2 is a perspective view of the cylinder.

Fig. 3 is an enlarged sectional view through one of the rasp bars.

Referring more in detail to the drawings:

1 designates the cylinder housing of a known type of grain combine, 2 a cylinder embodying my invention rotatably mounted in the housing above concaves 3, 4 a conveyor for discharging grain into the cylinder, and 5 is a conveyor for removing the threshed grain from the cylinder.

The conveyors and concaves may be of any conventional type as they specifically form no part of the present invention, except that the concaves, to particularly adapt them for cooperation with my improved cylinder, include a plurality of spaced parallel channel bars 6 mounted on a curved plate 7 and having inwardly extending flanges 8 for cooperating with the threshing elements of the cylinder to thresh the grain fed therebetween as in ordinary practice.

The cylinder 2 includes a shaft 9 rotatably mounted in bearings (not shown) supported by the walls of the housing, and fixed to the shaft, by keys 10, are cylinder heads 11 and 12 preferably pressed from sheet metal and having laterally extending peripheral flanges 13 and 14 respectively, cooperating with similar flanges 15 on intermediately positioned rings 16 and 17 for supporting rasp bars 18.

The rasp bars 18 are preferably formed of malleable metal, each including a flat rail portion 19 at its forward edge relative to direction of rotation of the cylinder, and a rear bar 20 provided with rasp teeth 21 and spaced outwardly from the rail 19 by an inclined web portion 22 to position the cylinder rasps in threshing relation with the channel bars of the concaves. The teeth 21 preferably comprise a plurality of substantially equally spaced ribs extending diagonally across the face of the offset portion of the bar as best shown in Fig. 2, and having vertical forward ends 23 for engagement with the grain, and upper faces 24 inclined outwardly and terminating in rounded ends 25 at the rear edge of the bar. Thus the upper faces of the teeth are inclined toward the forward rotation of the cylinder so that the grain is gradually pressed against the concaves as the cylinder teeth move over the concaves.

The rasp bars are spaced about the periphery of the cylinder and are secured to the flanges 13, 14 and 15 by bolts 26 and 27 extending through openings 28 and 29 in the bars, and through aligning openings 30 and 31 in the flanges (Fig. 3), the bolts 27 being preferably provided with flat heads 32 counter-sunk below the faces of the ribs so as not to interfere with the rasping action of the teeth. The under faces of the rasp bars are provided with lugs 33 of sufficient height to space the bars from the flanges to provide firm anchorage for the bars.

The number of rasp bars employed may depend on the type of grain being threshed, and the ribs on alternate bars may be arranged at different angles to increase threshing efficiency of the cylinder.

In order to assure positive feed of the grain into the cylinder and promote the threshing action, I provide the rear rail portions 19 with radial lugs or fingers 34 in the nature of ordinary cylinder teeth arranged in rows, preferably with the lugs of one row in staggered relation with the lugs of adjoining rows, which lugs serve to draw the straw from the conveyor 4 and force it through the cylinder. The lugs are preferably cast integral with the bars and formed with straight forward edges 35 which extend radially of the cylinder and inclined rear edges 36 to provide necessary body for strengthening and bracing the bars. The lugs project within the extended arcs defining the upper and lower extremity of the rasp teeth, but preferably terminate slightly short of the extreme outer threshing surfaces of the rasp teeth to avoid interference with the threshing operation of said rasp bars but promoting the threshing operation through beating contact of the lugs with the grain.

In operating a cylinder constructed and assembled as described, grain fed to the cylinder by the conveyor 4 is engaged by the lugs 34 and carried between the cylinder and concaves to be threshed by the advancing rasp surfaces of the bars, the lugs not only serving to feed the grain into and through the cylinder but also tending to straigthen the grain across the concaves and supplement the threshing effected by the rasps.

What I claim and desire to secure by Letters Patent is:

1. In a threshing cylinder including a shaft, spaced heads on the shaft, bars connecting the heads including threshing portions spaced from the periphery of the heads, and forwardly extending feeding portions connected with the threshing portions by inclined webs and including lugs having radially extending forward edges for engaging grain to advance the grain through the cylinder.

2. In a threshing cylinder including a shaft, spaced heads on the shaft, spaced bars connecting the heads having rasp-like surfaces, and radially extending lugs on the bars terminating slightly short of the outer extremity of the rasp-like surfaces.

3. In a threshing cylinder including a shaft and spaced heads on the shafts, rasp bars connecting the heads having a flat rail portion and an integral outset rail portion, rasp teeth on the outset portion and radially extending lugs on the flat portion projecting above the outset rail portion for drawing the grain into threshing relation with the rasp teeth.

4. In a threshing cylinder including a shaft, spaced heads on the shaft having peripheral flanges, bars connecting the heads having forwardly extending flat portions secured to said flanges and outwardly spaced rasp portions having depending lugs for spacing said portions from the flanges and having an inclined web portion connecting the flat portion with the rasp portion, and integral lugs extending radially from the flat portion of the bars having radially extending forward edges for engaging grain to advance the grain through the cylinder and having inclined rear edges to provide for strengthening the lugs.

In testimony whereof I affix my signature.

CLARENCE A. STEVENS.